(No Model.)

J. B. WILSON.
TUBE FOR BLOWING GLASS AND MODE OF MANUFACTURING THE SAME.

No. 268,162. Patented Nov. 28, 1882.

Witnesses:
P. C. Dietrich
A. Dietrich

Inventor:
Joseph B. Wilson
by
S. Lloyd Wiegand
Attorney.

UNITED STATES PATENT OFFICE.

JOSEPH B. WILSON, OF CLAYTON, NEW JERSEY, ASSIGNOR OF ONE-HALF TO DAVID WILSON MOORE, OF SAME PLACE.

TUBE FOR BLOWING GLASS AND MODE OF MANUFACTURING THE SAME.

SPECIFICATION forming part of Letters Patent No. 268,162, dated November 28, 1882.

Application filed September 12, 1882. (No model.)

*To all whom it may concern:*

Be it known that I, JOSEPH B. WILSON, of the town of Clayton, in the county of Gloucester and State of New Jersey, have invented a certain new and useful Improvement in Tubes for Blowing Glass and in the Mode of Manufacturing the Same; and I do hereby declare the following to be a sufficiently full, clear, and exact description thereof to enable others skilled in the art to make and use the said invention.

The object of this invention is to increase the durability and efficiency of the tube and to diminish the cost of manufacture thereof; and to effect these objects the nature of my invention consists in a tube having a detachable end, made of homogeneous metal, for attaching to the fused glass of the ware, in combination with a hollow shaft or blowing-tube, a special construction of joint for producing an air-tight connection between the parts, and in a special form of screw-thread combined therewith for avoiding the inconvenience incident to the expansion of parts at unequal temperatures.

I will now proceed to describe the mode of making and using this invention, referring in so doing to the drawings annexed and the letters of reference marked thereon.

Figure 1:
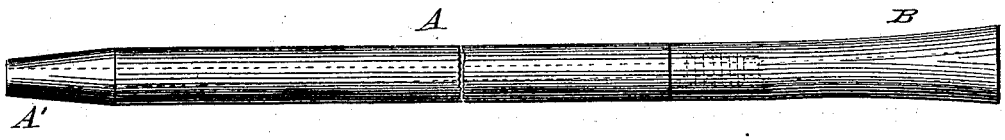
Figure 2:
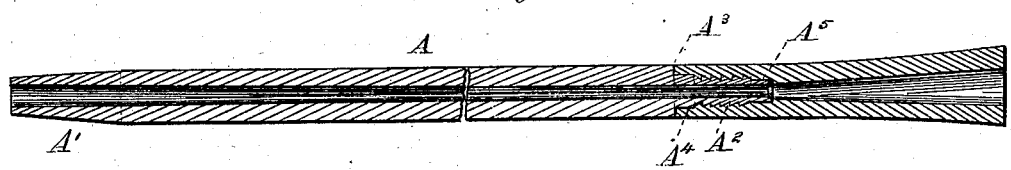
Figure 3:
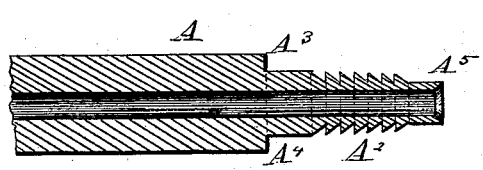
Figure 4:
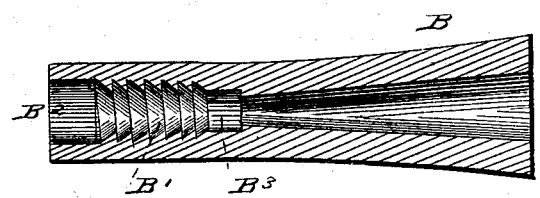
Figure 5:
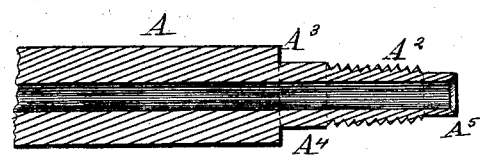
Figure 6:
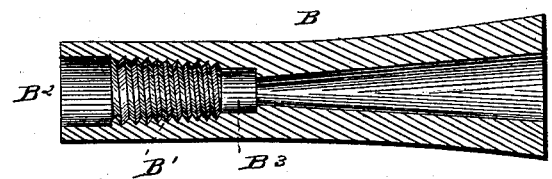

Figure 1 shows a side view; Fig. 2, a longitudinal section. Figs. 3 and 4 show in section the parts separately; Figs. 5 and 6 modifications, and Figs. 7 and 8 other modifications, of the invention.

The same letters of reference apply to the same parts in the several figures.

A represents the shaft or tube, having the usual tapered and rounded end, A', for the mouth of the operator, a thread, $A^2$, cut upon the other end of the tube, a shoulder, $A^3$, with a cylindric or tapering surface, $A^4$, contiguous to the screw-thread $A^2$, a similar cylindric or tapering surface, $A^5$, at the extremity of the tube A beyond the screw-thread $A^2$.

Figure 7:
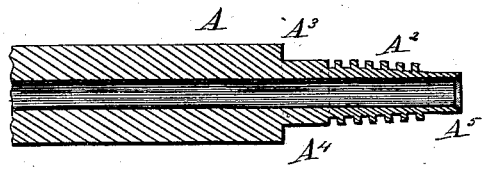
Figure 8:
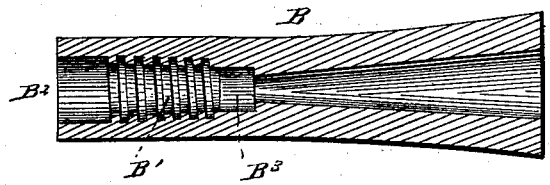

Upon the tube A a head, B, or expansion of the tube is screwed. This is preferably made of wrought-iron, or of steel or other homogeneous metal adapted to adhere to glass when heated. This is threaded internally at B' and fits on the screw A. The parts $B^2$ and $B^3$ of the head B at each end of the female screw B' fit accurately over the parts $A^4$ and $A^5$, so as to be central on the parts $A^4$ and $A^5$, irrespective of the fitting of the male and female screws on the tube A and in the head B. The screw-thread on the tube A and the corresponding screw-thread in the head B are made with one of their surfaces at right angles to the axis of the tube and the other oblique thereto, as shown in Figs. 2, 3, and 4, but may be made of the ordinary form, as shown in Figs. 5 and 6, or of the "square thread" form, as shown in Figs. 7 and 8. The effect of this form of thread at right angles to the axis of the tube is that expansion of the head containing the female screw does not slacken or loosen the hold between the parts $B^2$ and $B^3$, $A^4$ and $A^5$, when the head B expands prior to the heating of the tube A.

The advantages of these tubes for blowing glass are as follows:

First. A full and clear passage for air is preserved through the tube, not found in tubes having heads welded thereon, as usually done. The heads B, being burned out or oxidized and wasted away faster than the tubes A, are an article of manufacture salable and merchantable separately from the tubes A, and form an important feature of this invention as sold separately from the tubes A.

Second. The head, being made of homogeneous metal, does not corrode or burn away in streaks or channels, as in ordinary welded heads.

Third. The heads last longer by reason of their close and uniform texture or grain of material.

Fourth. The head, being detachable, can be readily removed and replaced by workmen not skilled in the art of welding metals, and can be cheaply and readily replaced when worn or "burned" out.

I am aware that pipes for blowing glass have been made wherein a ball or bulb of earthenware was screwed upon the end of a metallic tube by ordinary screw-threads. Such blow-pipes are objectionable by reason of their want of durability and liability to adhere to and impair the glass, and are not claimed as within the scope of this invention; but Having described my invention and the mode of making the same, what I claim is—

1. A glass-blower's tube consisting essentially of a tube, A, having a screw-thread formed thereon, and provided with cylindric or conical bearings $A^4$ and $A^5$, combined with a metallic head, B, similarly threaded internally, and provided with cylindric or conical bearings $B^2$ and $B^3$, fitting upon the bearings $A^4$ and $A^5$, substantially as set forth and described.

2. A glass-blowing pipe or tube consisting of a threaded tube and head having screw-threads, one surface of which threads is at right angles to the said tube and head, substantially as set forth and described.

3. A glass-blower's tube having shoulders and contiguous cylindric bearings $A^4$ and $A^5$, in combination with a head having corresponding shoulders, $B^2$ and $B^3$, and united with the tube A by screw-threads, having one or more planes at right angles to the axis thereof, substantially as set forth.

4. As an article of manufacture, metallic tube-heads B, screw-threaded internally and provided with bearings $B^2$ and $B^3$, adapted to fit upon correspondingly-formed threads and bearings upon a tube, A, as and for the purpose set forth.

JOSEPH B. WILSON.

Witnesses:
J. DANIEL EBY.
LINN WHEELER.